(12) United States Patent
Pihlaja (10) Patent No.: US 7,479,947 B2
(45) Date of Patent: *Jan. 20, 2009

(54) FORM FACTOR FOR PORTABLE DEVICE

(75) Inventor: Pekka Juhana Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 495 days.

This patent is subject to a terminal disclaimer.

(21) Appl. No.: 11/234,282

(22) Filed: Sep. 26, 2005

(65) Prior Publication Data

US 2006/0017711 A1    Jan. 26, 2006

Related U.S. Application Data (63) Continuation of application No. 09/988,740, filed on Nov. 20, 2001, now Pat. No. 7,009,599.

(51) Int. Cl.
*G09G 5/00* (2006.01)

(52) U.S. Cl. .................. 345/173; 345/156; 345/177; 715/732; 715/784; 715/786; 715/788

(58) Field of Classification Search ......... 345/156–168, 345/172, 173, 175, 184; 715/732, 784, 786–788, 715/833, 855, 856, 862, 864; 361/681, 683; 455/556, 566, 575
See application file for complete search history.

(56) References Cited

U.S. PATENT DOCUMENTS 5,278,779 A    1/1994   Conway et al.

(Continued)

FOREIGN PATENT DOCUMENTS

EP    0 880 090 A2    11/1998

(Continued)

OTHER PUBLICATIONS

Bederson, Ben, et al., "Implementing a Zooming User Interface: Experience Building Pad++", Retrieved from Internet Jun. 12, 2001, University of Maryland, Computer Science Department, College Park, MD.

(Continued)

*Primary Examiner*—Henry N Tran
(74) *Attorney, Agent, or Firm*—Banner & Witcoff, Ltd.

(57) ABSTRACT

A form factor for a portable device is disclosed. A first face of the portable device may house a display screen and three linear input devices (e.g., touch-sensitive strips), one on each of three sides of the display screen, for providing user input. On a second, opposite face of the portable device, is a planar input device (e.g., a touchpad) for providing user input. There may also be a microphone and speaker on the second face of the portable device, with the speaker placed behind the planar input device. Sound output by the speaker passes through holes in the planar input device. In one embodiment, the planar input device is used for scrolling content displayed on the display screen, one of the linear input devices is used for zooming in and out, and the other two linear input devices are used for identifying a location on the display screen. In another embodiment, the planar input device is used to identify a location on the display screen, and two of the linear input devices are used for scrolling.

36 Claims, 6 Drawing Sheets

U.S. PATENT DOCUMENTS

| | | | |
|---|---|---|---|
| 5,329,577 A * | 7/1994 | Norimatsu | 455/567 |
| 5,374,942 A | 12/1994 | Gilligan et al. | |
| 5,530,455 A | 6/1996 | Gillick et al. | |
| 5,542,138 A | 8/1996 | Williams et al. | |
| 5,543,588 A | 8/1996 | Bisset et al. | |
| 5,598,527 A * | 1/1997 | Debrus et al. | 345/173 |
| 5,615,384 A | 3/1997 | Allard et al. | |
| 5,729,219 A * | 3/1998 | Armstrong et al. | 341/20 |
| 5,771,038 A | 6/1998 | Wang et al. | |
| 5,825,349 A | 10/1998 | Meier et al. | |
| 5,943,052 A | 8/1999 | Allen et al. | |
| 5,952,994 A | 9/1999 | Ong et al. | |
| 5,999,169 A | 12/1999 | Lee | |
| 6,025,832 A | 2/2000 | Sudo et al. | |
| 6,031,518 A | 2/2000 | Adams et al. | |
| 6,131,047 A * | 10/2000 | Hayes et al. | 455/566 |
| 6,201,947 B1 | 3/2001 | Hur et al. | |
| 6,211,856 B1 | 4/2001 | Choi et al. | |
| 6,323,883 B1 | 11/2001 | Minoura et al. | |
| 6,349,220 B1 * | 2/2002 | Prior et al. | 455/566 |
| 6,407,749 B1 | 6/2002 | Duke | |
| 2001/0023499 A1 | 9/2001 | Wakahara | |
| 2002/0140680 A1 | 10/2002 | Lu | |
| 2002/0158838 A1 * | 10/2002 | Smith et al. | 345/156 |

FOREIGN PATENT DOCUMENTS

| | | |
|---|---|---|
| EP | 0 880 091 A2 | 11/1998 |
| EP | 0 880 090 A3 | 11/2000 |
| WO | WO 99/32960 | 7/1999 |
| WO | WO 99/54807 | 10/1999 |

OTHER PUBLICATIONS

Bederson, Ben, et al., "Pad++: A Zoomable Graphical Sketchpad For Exploring Alternate Interface Physics", Computer Science Department, University of New Mexico, Albuquerque, NM, Sep. 19, 1995.

Bederson, Ben, et al., "A Zoomable Web Browser", Retrieved from Internet Jun. 12, 2001, Computer Science Department, University of New Mexico, Albuquerque, NM.

Meyer, Jonathan, "A Brief Tour Through Pad++", Apr. 1997, Retrieved from Internet Jun. 12, 2001.

Stewart, Jason, et al., "When Two Hands Are Better Than One: Enhancing Collaboration Using Single Display Groupware", Computer Science Department, University of New Mexico, Albuquerque, NM.

"Learn More; What is Jazz?", Retrieved from Internet Jun. 12, 2001, Computer Science Department, University of Maryland, College Park, MD.

"Frequently Asked Questions", Retrieved from Internet Jun. 12, 2001, Computer Science Department, University of Maryland, College Park, MD.

* cited by examiner

FORM FACTOR FOR PORTABLE DEVICE

FIELD OF THE INVENTION

The invention relates generally to portable electronic devices. More specifically, the invention includes a form factor for a portable device that is optimized for viewing and navigating displayed content on a display screen of the device.

BACKGROUND OF THE INVENTION

A common disadvantage of conventional portable devices, such as mobile telephones and personal digital assistants (PDA), is that they often include small display screens. Small display screens make it difficult for users to view and navigate large data files. For instance, when viewing a web page on a PDA with a small display screen, the user can only view a very limited portion of the web page at a time. The user typically must repeatedly scroll vertically and horizontally to view the entire page.

In addition, known devices use cumbersome navigational and input mechanisms. For instance, on a typical PDA, a user must use a stylus to touch a small scroll bar displayed on the already small touch-sensitive display screen in order to navigate a document. Interacting with the small scroll bar requires very fine motor skills and is often difficult for many users. Some of these devices (e.g., Palm) provide a soft keyboard that allows a user to enter data by tapping on tiny keys on a keyboard representation on the display.

Known mobile telephones have similar disadvantages. The user must typically use buttons that act as horizontal and/or vertical scroll buttons. However, the use of buttons for scrolling does not allow a user to accurately select a position in a document except at finite intervals. While this may be acceptable when navigating documents with preexisting finite scroll intervals (such as lines in a text document), this is not acceptable when navigating a document that does not contain finite scroll intervals (e.g., a map).

Another common disadvantage with mobile telephones is that the speaker takes up some of the limited amount of external space available on the device. If the speaker is placed on the front of the device with the display screen, then the display screen is smaller than it otherwise could be without the speaker on the same face of the device. If the speaker is placed on the back of the device, then the back of the device has less room for other any input device that is also placed on the back of the device. One known solution to these problems is to add an external device that includes the speaker. For example, Handspring® PDAs allow a user to attach an external mobile telephone Springboard® module (VisorPhone®) that includes the speaker through which sound is played. However, this solution requires the addition of new hardware (i.e., the Springboard module) to the underlying PDA.

Thus, it would be an advancement in the art to provide a portable device that is optimized for viewing data on its display screen, allowing a user to view a larger portion of a data file than previous solutions while maintaining a small form factor and user-friendly input and navigational mechanisms. It would be a further advancement in the art to provide a portable device in which the speaker does not consume external space beyond that of other input and output devices on the portable device, without requiring the addition of new hardware.

BRIEF SUMMARY OF THE INVENTION

The inventive system overcomes the problems of the prior art by providing a form factor for a portable device that maximizes a size of a display screen, allowing users to view larger portions of a data file displayed on a display screen. The form factor provides a display screen that utilizes a substantial portion of a front face of the portable device. The display screen may be surrounded by three touch sensitive control strips, each on a different side of the display screen. One of the control strips may be used for movement of a vertical crosshair element, another for movement of a horizontal crosshair element, and the third for zooming in or out of the presently displayed document, optionally centered at the intersection of the crosshair elements.

The back face of the device may be configured with a touchpad covering a substantial portion of the back face. The touchpad may be used for navigating the presently displayed document by touching a finger to the touchpad and "dragging" the image displayed on the display screen. The back face may also include a microphone for audio input into the device, and a speaker for playing audio output from the device. The speaker may be placed behind the touchpad by including holes in the touchpad through which the speaker sound may be heard.

BRIEF DESCRIPTION OF THE DRAWINGS

The present invention is described with respect to the accompanying figures, in which like reference numerals identify like elements, and in which.

DETAILED DESCRIPTION OF THE INVENTION

Figure 1:
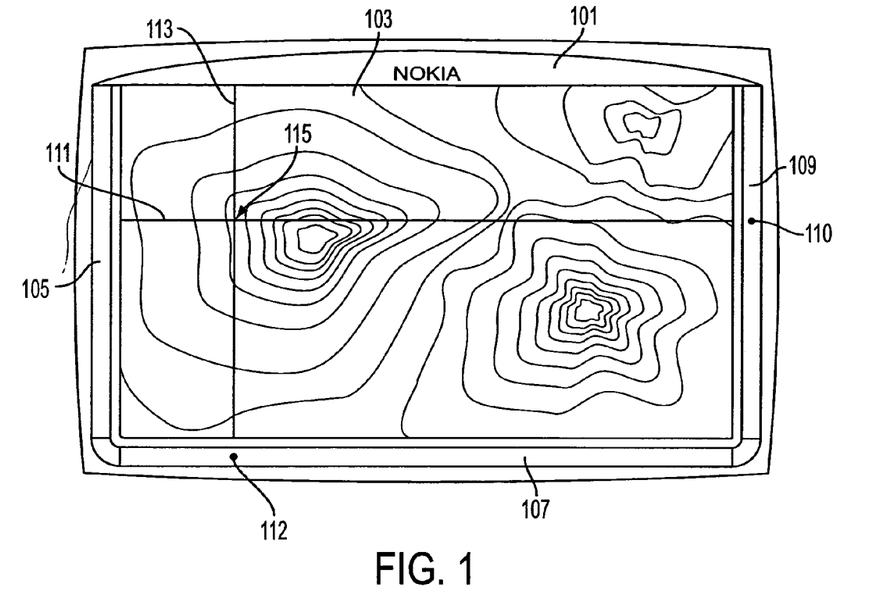
FIG. 1 illustrates a front face of a device according to an embodiment of the invention.

With reference to FIG. 1, an embodiment of the invention provides a form factor for a portable device 101, which may be a mobile telephone, personal digital assistant (PDA), portable computer device, browsing device, electronic book reader, or any combination thereof. Portable device 101 may include a display screen 103 and linear input devices 105, 107, and 109. Each linear input device may be a touch-sensitive membrane, a linear roller, a mechanical slider, optical sensor, or any other linear input device that can determine a linear position of input. For purposes of illustration only, portable device 101 is described with linear input devices 105, 107, and 109 being touch sensitive strips.

Each linear input device may be located on differing sides of display screen 103, with a fourth side remaining vacant. Linear input device 105 may be located on a left side of display screen 103, linear input device 107 may be located below display screen 103, and linear input device 109 may be located on a right side of display screen 103. In one embodiment, linear input devices 105 and 107 may be substantially perpendicular to each other, and linear input devices 107 and 109 may be substantially perpendicular to each other. However, other configurations are also possible. Optionally, in order to provide tactile feedback to a user as the user manipulates each input device and/or selects displayed soft buttons (described below), each linear input device may be mounted on dome switches.

For purposes of illustration only, portable device 101 is shown and described in a horizontal orientation. However, portable device 101 may be configured for use in either a horizontal or vertical orientation, depending on an application program in use, data displayed on display screen 103, user preferences, etc.

A first linear input device, for example linear input device 105, may be used for zooming in and out of content displayed on display screen 103. As a user moves her hand in one direction along linear input device 105, the portable device may zoom in, or enlarge, content displayed on the display screen 103. As the user moves her hand in the other direction along linear input device 105, the portable device may zoom out, or reduce, content displayed on the display screen 103. Optionally, the direction of input for zooming in/out of content may be user-configurable via a preferences screen (not shown) displayable on portable device 101, such that either direction may be used for zooming in/out. Alternatively, the direction of input for zooming in/out may be factory preset. In addition to sliding her finger along linear input device 105, the user may simply touch linear input device 105 at an arbitrary position to quickly zoom in or out to a zoom level corresponding to the touched position.

In one embodiment of the invention, the two linear input devices 107 and 109 may be used for manipulating crosshairs to identify a location within an image displayed on display screen 103. That is, linear input device 107 may be used to manipulate a vertical crosshair for identifying a horizontal position on the display screen, and linear input device 109 may be used to manipulate a horizontal crosshair for identifying a vertical position on the display screen. The combination of the horizontal and vertical crosshairs may identify a point on the display screen. For example, when a user touches linear input device 107 at location 112, vertical line 113 may be displayed to identify the corresponding horizontal position on display screen 103. Similarly, when the user touches linear input device 109 at location 110, horizontal line 111 may be displayed to identify the corresponding vertical position on display screen 103. Vertical line 113 and horizontal line 111 together form crosshairs that identify a point at intersection 115 on display screen 103. In alternative embodiments, lines might not be displayed on display screen 103 when a user identifies a horizontal and/or vertical position, or the crosshairs might not extend the length and/or width of the display screen.

Figure 2:
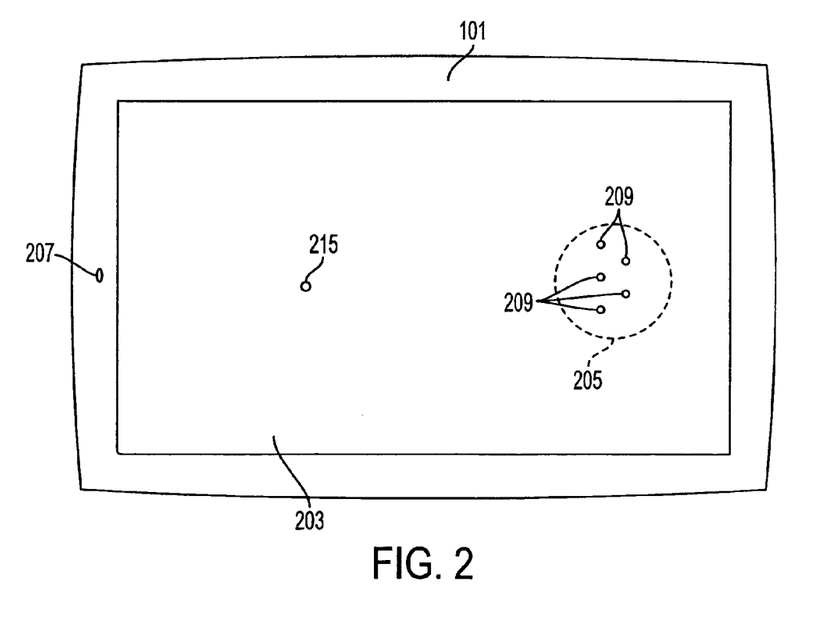
FIG. 2 illustrates a back face of a device according to an embodiment of the invention.

With further reference to FIG. 2, portable device 101 may also include a planar input device 203 located on the opposite face of the portable device as display screen 103. This could include any input device that can receive two-dimensional input, regardless of whether the input device is actually a flat plane. For instance, a planar input device may be mounted in a curved or spherical position, yet still receive two-dimensional input. Planar input device 203 may be a touchpad that senses a location of input based on a user touching it and/or moving a finger (or stylus) on it. Other known planar input devices may also be used. For purposes of illustration only, portable device 101 is described with planar input device 203 being a touchpad.

In the embodiment of the invention where linear input devices 107 and 109 are used for identifying a horizontal line, a vertical line, and/or a point on display screen 103, touchpad 203 may be used for navigation of an image (e.g., a map, picture, text document, web page, etc.) displayed on display screen 103. That is, as a user touches touchpad 203, the portable device may be configured to respond as if the user is "gripping" the presently displayed image, and horizontally and vertically scrolls the image corresponding to the user's horizontal and vertical movement on touchpad 203, similar to known click and drag techniques used with computer mice and conventional computer systems. An example of such a technique is the Hand Tool in Adobe Acrobat® Reader, available from Adobe Systems Incorporated of San Jose, Calif. Essentially, the user "touches" the displayed image from behind and moves it with a finger.

Planar input device 203 may also be used for alternative forms of input, depending on the current application in use. For example, when an imagery application is being used, planar input device 203 may be used by a user to "draw" on display screen 103. Input received via planar input device 203 may be displayed in mirror image on display screen 103 so that it appears as if the user is touching planar input device 203 at a position directly behind display screen 103. For example, intersection 115 on display screen 103 may correspond to input received at point 215 on planar input device 203. As should be apparent to one of skill in the art, portable device 101 may be configured to receive straight input from planar input device 203 without using a mirror image algorithm, and portable device 101 may use input received from planar input device 203 for any purposes and in any manner known in the art.

Portable device 101 may also include a speaker 205 and microphone 207 for receiving and generating audio signals, such as for use with mobile telephone capabilities. Speaker 205 may be located inside portable device 101 behind planar input device 203, and the audio output may be emitted through one or more holes 209 in planar input device 203. Preferably, planar input device 203 is rigid enough such that the diameter of holes 209 at their narrowest point and the thickness of planar input device 203 do not change as sound waves are emitted from speaker 205. If the dimensions of the holes or thickness of the planar input device change, the sound may be distorted. Planar input device 203 may be an optical HALIOS sensor touchpad system, an EMFi sensor touchpad, a capacitive touchpad, or any other known touchpad in which holes can be pierced. The HALIOS sensor and Ethertouch capacitance touchpads fulfill these requirements, as there are no separate touch-sensitive layers on the back cover of the device with which sound would interfere. When a HALIOS touchpad is used, sensors may be placed at the edges of the back cover. When an Ethertouch capacitive touchpad is used, the sensors may be placed under the back cover. HALIOS touchpads are available from Mechaless Systems of Karlsruhe, Germany, and EMFi touchpads are available from Emfitech Ltd., of Vaajakoski, Finland. Capacitive touchpads are generally known in the art, and are available from at least Ethertouch of Labuan, Malaysia, and Synaptics, Inc. of San Jose, Calif.

Figure 3:
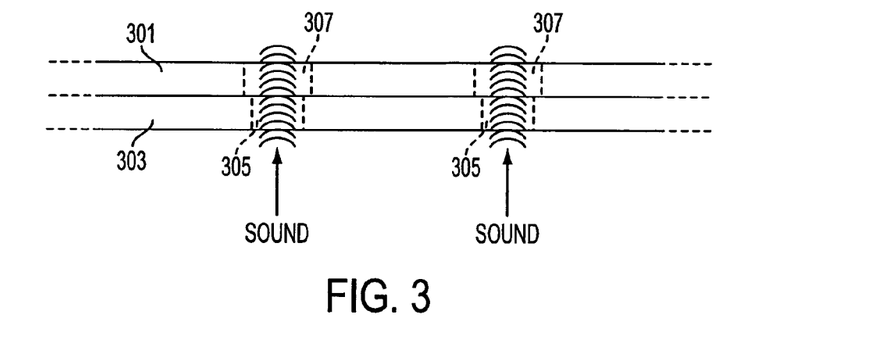
FIG. 3 illustrates a cross-section of a touchpad over an A-cover according to an embodiment of the invention.

With reference to FIG. 3 (not to scale), other touchpads known in the art, such as mechanically soft touchpads, may also be used. A mechanically soft touchpad 301 may be placed over the back cover 303 of a portable device. The back cover 303 may have rigid holes 305 and the soft touchpad layer on top of it has slightly larger holes 307. In this manner, the narrowest point of the holes through which sound passes is on the back cover, eliminating any distortion the sound may cause to the touchpad. Thus, any touchpad that allows holes pierced in it can be used with the invention.

Figure 4:
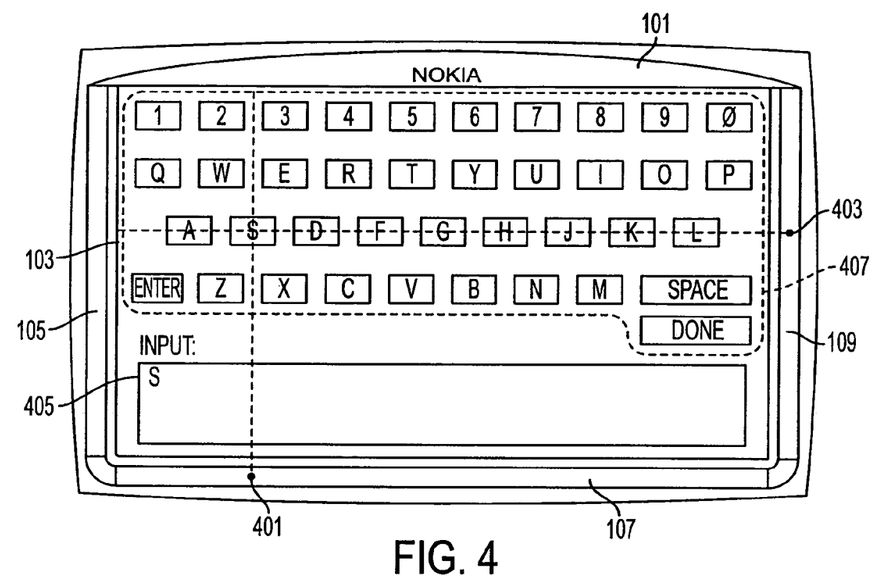
FIG. 4 illustrates a device displaying a soft keyboard according to an embodiment of the invention.

In one embodiment, with reference to FIG. 4, linear input devices 107 and 109 may be used to identify a location of one of a plurality of soft buttons displayed on display screen 103. Soft buttons are generally known in the art and may be defined as a display element displayed on a display screen that, when selected, provides corresponding predefined input to a portable device. The inventive portable device may be used to select soft buttons using one or more of linear input devices 105, 107, and 109, and planar input device 203. The input may be predefined by an application program, configured by a user, or the like. For example, FIG. 4 illustrates a portable device 101 configured to display a plurality of soft buttons that represent a soft keyboard 407 through which a user may provide alphanumeric input. Soft keyboards are also generally known in the art, e.g., as used with PALM® personal digital assistants. Soft keyboard 407 may include alphanumeric keys A-Z and 0-9, SPACE, and ENTER. It should be apparent to one of skill in the art that other soft buttons may also or alternatively be included, such as special characters, symbols, letters, function keys, alternative control keys (e.g., CTRL, ALT), formatting keys (e.g., INS, DEL), and any other keys with corresponding input, including any key located on known computer keyboards, macro keys, and the like.

In one embodiment, a user may select a soft button by touching its corresponding horizontal and vertical positions using linear input devices 107 and 109, respectively. For example, a user may select the letter 'S' by touching linear input device 107 at position 401, and touching linear input device 109 at position 403. As a result, the letter 'S' may be input and displayed in input box 405. When the user has completed her input, the user may submit the input by selecting the DONE soft button.

In another embodiment, additional confirmation is used to input the selected soft button. For instance, a user may select the 'S' soft button using linear input devices 107 and 109. In response, portable device 101 may highlight the 'S' soft button or otherwise indicate the 'S' soft button is selected. The user, having received confirmation that the letter 'S' is selected, may then confirm the input by tapping on the planar input device 203. Upon receiving the confirmation, the letter 'S' is input and may be displayed in input box 405. It should be appreciated by one of skill in the art that other forms of confirmation may alternatively be used. For example, when one or more linear input devices are mounted on a raised mound, the confirmation may consist of the user pressing the linear input device such that the raised mound yields, or "pops," inward. In another embodiment, the soft button might not be selected until the user taps one of the two linear input devices. Using confirmation input provides tactile feedback to the user that she has successfully selected a soft button, and also allows the user to confirm that the correct soft button will be selected before committing to the input decision.

Figure 5:
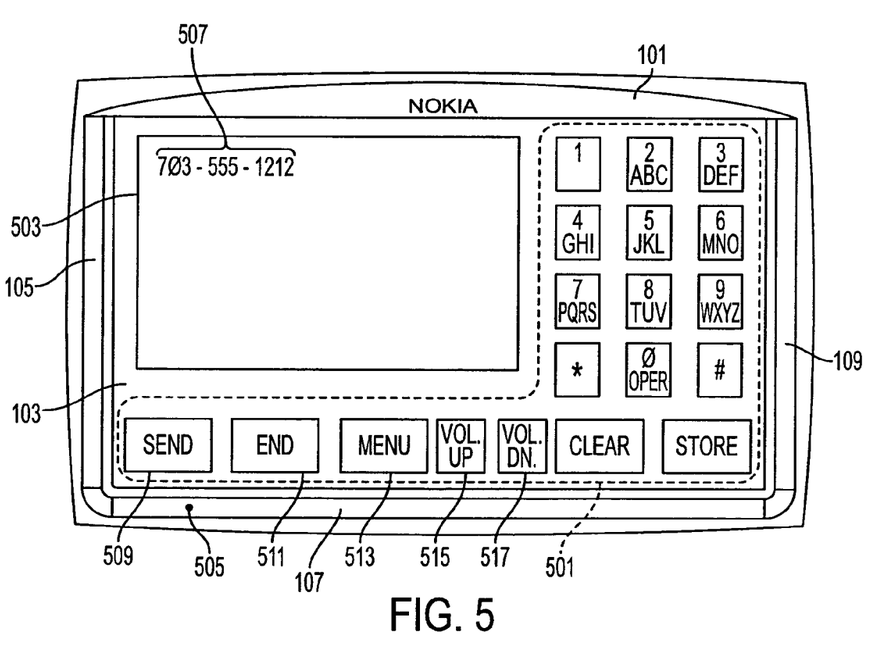
FIG. 5 illustrates a device displaying mobile telephone soft buttons according to an embodiment of the invention.

With reference to FIG. 5, as previously discussed above, portable device 101 may comprise a mobile telephone. FIG. 5 illustrates soft buttons 501 for providing common mobile telephone functions. That is, linear input devices 105, 107, and 109 may be used by a user to input a telephone number 507 in virtual display window 503. Virtual display window 503 may be any portion of display screen 103 that is used in place of a conventional mobile telephone display. Telephone number 507 may be input by a user as discussed above. In one embodiment of the invention, when a mobile telephone call is in progress, planar input device 203 (not shown) is deactivated because the user may accidentally touch planar input device with her cheek while listening to speaker 205 and speaking into microphone 207.

In some embodiments, such as that shown in FIG. 5, one or more soft buttons may require only the use of a single linear input device. That is, soft buttons 509-517 may be selected by activating linear input device 107 at a corresponding position. For example, a user may select the SEND button by pressing linear input device 107 at location 505, without requiring any input from either linear input device 105 or linear input device 109. In this manner, important phone functions may be performed with a single hand. It should be obvious to one of skill in the art, however, that portable device 101 may be configured in endless variations for providing input using any variety and combination of soft buttons.

Figure 6:
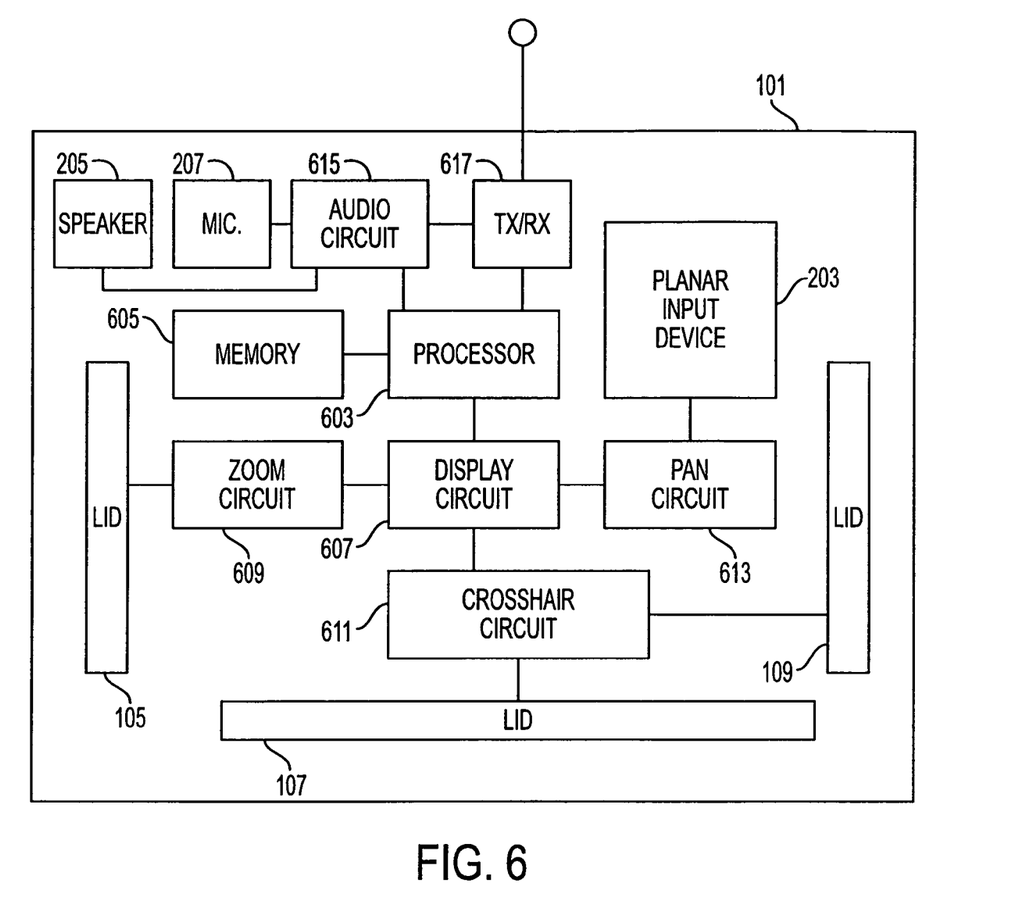
FIG. 6 illustrates a schematic diagram of a device according to an embodiment of the invention.

FIG. 6 illustrates a schematic diagram of portable device 101 according to an embodiment of the invention. In addition to linear input devices 105, 107, and 109, planar input device 203, speaker 205, and microphone 207, portable device 101 may include a processor 603, memory 605, display circuit 607, zoom circuit 609, crosshair circuit 611, pan circuit 613, audio circuit 615, and transceiver 617. Memory 605 may consist of RAM, ROM, a hard disk, or any other computer readable medium or combination thereof, and may be used for storing operating system information, application software, control logic, and the like. Display circuit 607 may be connected to processor 603, and may perform updates to an image on the display screen (not shown) based on input received from zoom circuit 609, crosshair circuit 611, and pan circuit 613. Zoom circuit 609 may receive input from linear input device 105. Crosshair circuit 611 may receive input from linear input device 107 and 109. Pan circuit may receive input from planar input device 203. Audio circuit may be used to generate and receive audio signals to and from speaker 205 and microphone 207, respectively. Audio circuit 615 may further be connected to processor 603 and/or transceiver 617, when mobile device 101 includes wireless communications capabilities.

FIG. 6 is merely an illustrative example of a portable device that may be used. Other configurations may alternatively be used, with additional and/or fewer elements (e.g., with an integrated input circuit, etc.). Each circuit may be performed by hardware, software, or a combination of the two, and may reside in separate or combined components or modules. In addition, some elements may be optional. For example, speaker 205, microphone 207, audio circuit 615, and transceiver 617 might not be used in an embodiment of the invention comprising an electronic book reader.

It will be appreciated by those of skill in the art that additional modifications may be made to portable device 101 that fall within the scope and spirit of the invention. For instance, linear input devices 107 and 109 may be connected to pan circuit 613 and control panning of an image on the display screen, while planar input device 203 may be connected to crosshair circuit 611 and control manipulation of the crosshairs. In addition, configurations may be alterable by a user or an application program based on an orientation of the portable device (horizontal versus vertical), the dominant hand of the user (e.g., for right versus left-handed users), user preferences, and the like. For example, a user may prefer to use linear input device 109 for zooming and linear input devices 105 and 107 for crosshair manipulation. One of skill in the art will appreciate that countless variations are possible without departing from the spirit and scope of the invention.

Figure 7:
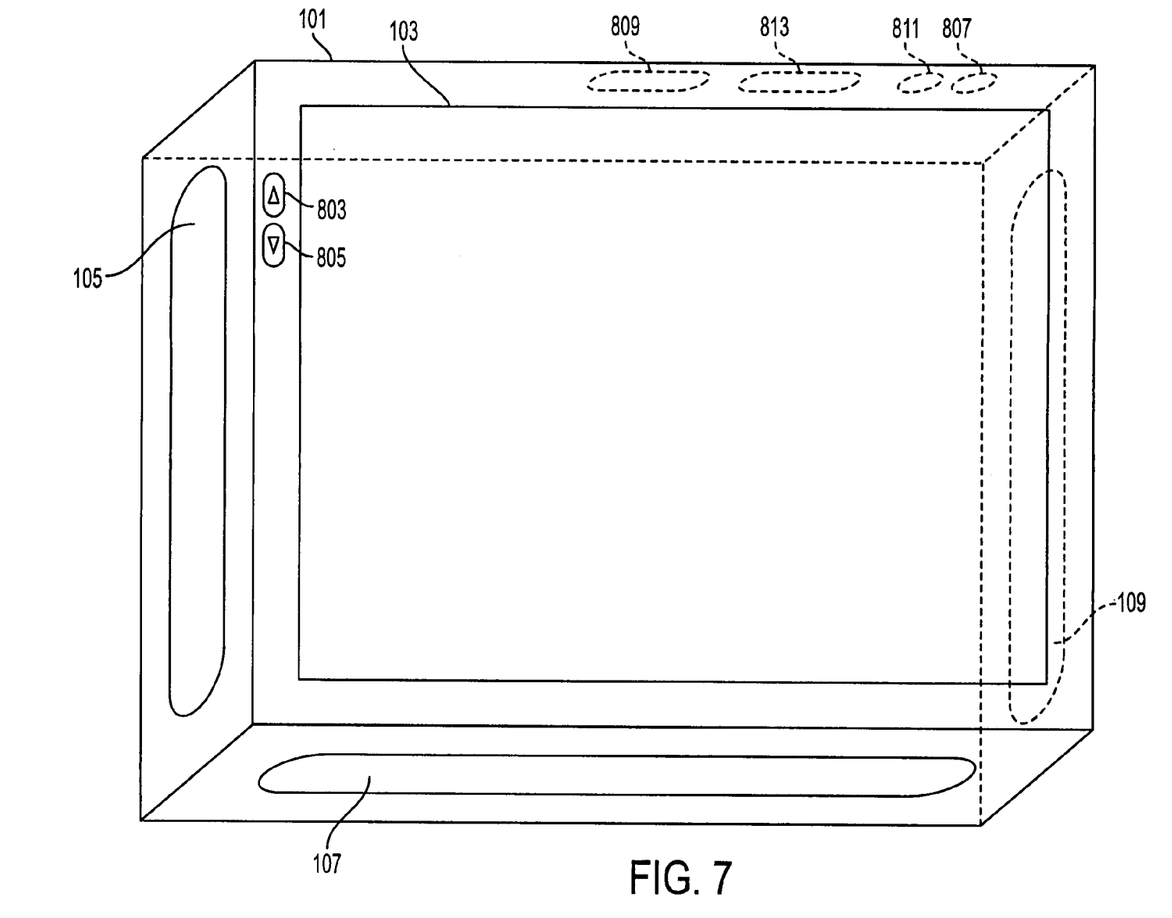
FIG. 7 illustrates a device according to an embodiment of the invention.

In another embodiment of the invention, linear input devices 105, 107, and 109 may be placed on sides other than the same side as display screen 103, such as is illustrated in FIG. 7. It should also be apparent to one of skill in the art that any embodiment of portable device 101 may be adapted with other common elements, such as conventional hard buttons 803, 805, audio output port 807, infrared port 809, power adapter input 811, data communication port 813 (e.g., USB, proprietary format, etc.), and the like, as is known in the art.

Figure 8:
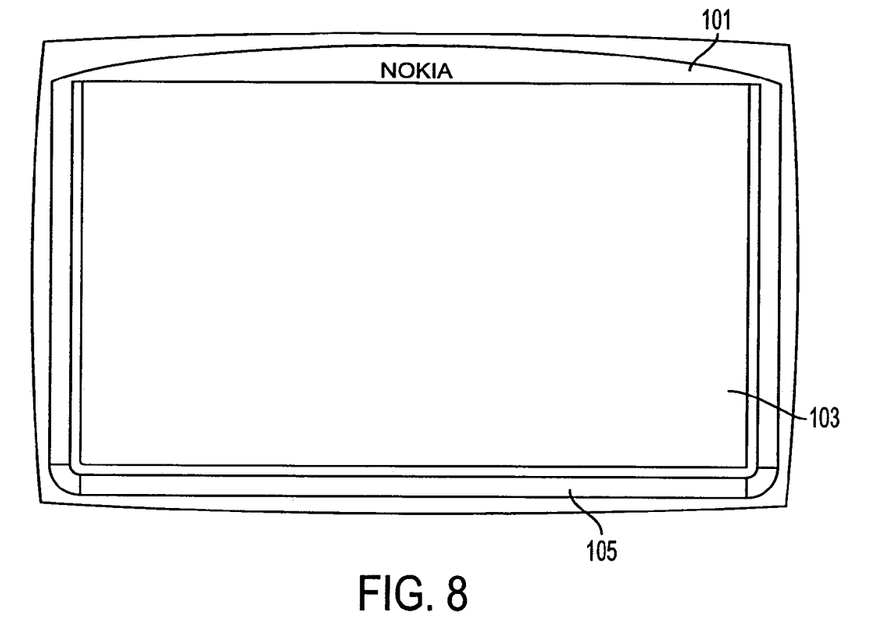
FIG. 8 illustrates a front face of a device according to an embodiment of the invention.
Figure 9:
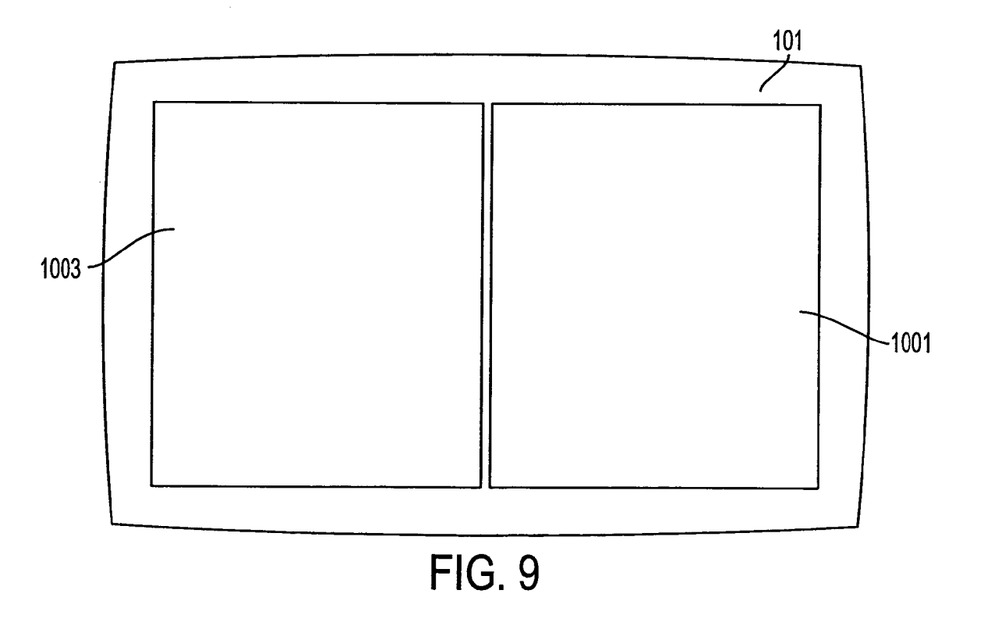
FIG. 9 illustrates a back face of a device according to an embodiment of the invention.

In another alternative embodiment of the invention, shown in FIG. 8 and FIG. 9, portable device 101 may include a single linear input device 105 for zooming content, and two planar input devices 1001, 1003. One of the planar input devices performs panning (i.e., scrolling) an image on the display screen, and the other planar input device performs pointing (i.e., manipulation of the crosshairs).

Figure 10:
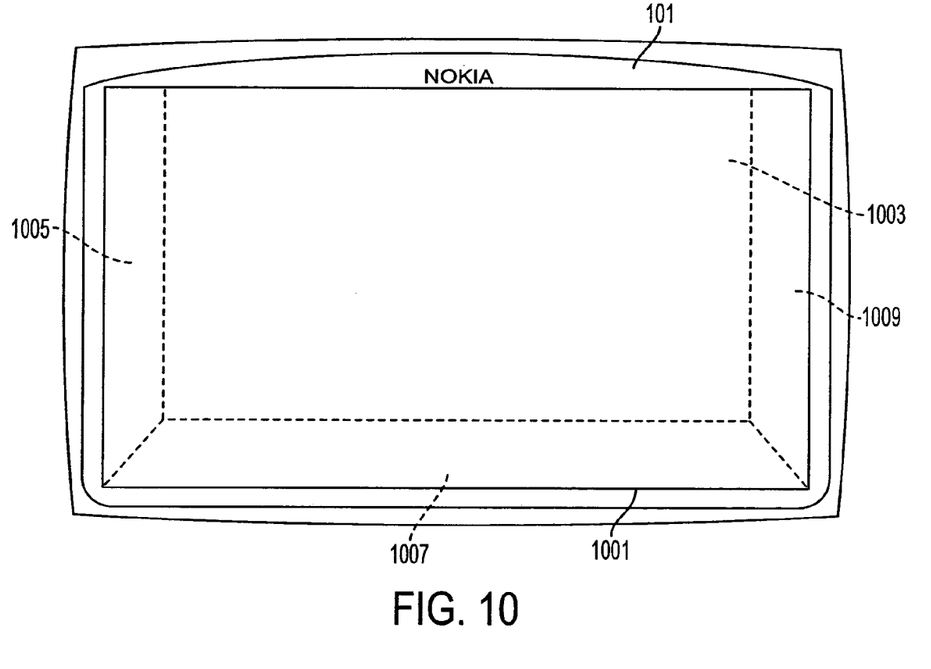
FIG. 10 illustrates a front face of a device according to an embodiment of the invention.

In still another embodiment of the invention, shown in FIG. 10, one or more linear input devices may comprise regions of a touch-sensitive planar input device. Portable device 101 may comprise a display screen 103 (FIG. 1), over which is a transparent planar touch-sensitive input device 1001, often referred to in combination as a touchscreen. However, by enlarging planar input device 1001 to extend beyond the displayable area of display screen 103, regions 1005, 1007, 1009 of the planar touch-sensitive input device that extend beyond the display screen's displayable area may form the linear input devices. Portable device 101 may include control logic (e.g., in one or more of zoom circuit 609, crosshair circuit 611, and pan circuit 613) for sensing linear input in an elongated direction in each region 1005, 1007, and 1009 so that region 1005, 1007, and 1009 correspond to linear input device 105, 107, and 109 (not shown), respectively. Region 1003 may be used in combination with display screen 103 to perform as a touchscreen on portable device 101.

While the invention has been described with respect to specific examples including presently preferred modes of carrying out the invention, those skilled in the art will appreciate that there are numerous variations and permutations of the above-described systems and techniques that fall within the spirit and scope of the invention as set forth in the appended claims.

I claim:

1. An apparatus, comprising:
    a display screen on a front face of the apparatus,
    a first linear input device affixed along a first side of the display screen;
    a second linear input device affixed along a second side of the display screen;
    a third linear input device affixed along a third side of the display screen;
    a planar input device located on the back face of the apparatus; and
    control logic for manipulating content displayed on the display screen responsive to user input via the first, second, third, and planar input devices,
    wherein the control logic causes the apparatus to horizontally scroll an image displayed on the display screen responsive to input received through the first linear input device;
    wherein the control logic causes the apparatus to vertically scroll the image displayed on the display screen responsive to input received through the second linear input device;
    wherein the control logic causes the apparatus to enlarge and reduce the image displayed on the display screen responsive to input received through the third linear input device; and
    wherein the control logic causes the apparatus to identify a point on the display screen responsive to input received through the planar input device.

2. The apparatus of claim 1, wherein at least one of the first, second, and third linear input devices are located on the front face of the apparatus.

3. The apparatus of claim 1, further comprising a touch-sensitive planar input device used in conjunction with and extending beyond a displayable area of the display screen, and
    wherein at least one of the first, second, and third linear input devices comprise a region of the touch-sensitive planar input device extending beyond the displayable area of the display screen.

4. The apparatus of claim 1, wherein each of the first, second, and third linear input devices are one or more faces of the apparatus other than the front face of the apparatus.

5. The apparatus of claim 1, wherein each input device comprises a touch-sensitive input device.

6. The apparatus of claim 1, wherein when the identified point corresponds to one of a plurality of selectable icons displayed on the display screen, identifying the input data corresponding to the selected icon.

7. The apparatus of claim 6, wherein each icon represents an alphanumeric character displayed on a virtual keyboard, and the input data comprises an alphanumeric character corresponding to the selected icon.

8. The apparatus of claim 1, wherein the control logic causes the apparatus to display a selectable icon along an edge of the display screen corresponding to a side of the display screen on which is affixed a linear input device, and
    wherein when a user touches the linear input device on the corresponding side at a position corresponding to the displayed selectable icon, data associated with the selectable icon is input.

9. The apparatus of claim 1, wherein the apparatus highlights one of a plurality of selectable icons displayed on the display screen when the selected point corresponds to the one selectable icon, and wherein the apparatus receives input comprising data associated with the one selectable icon responsive to confirmation input received via one of the input devices.

10. The apparatus of claim 3, wherein the touch-sensitive planar input device used in conjunction with the display screen comprises a touchscreen.

11. The apparatus of claim 1, wherein the planar input device comprises a touchpad.

12. An apparatus, comprising:
    a display screen on a front face of the apparatus;
    a first linear input device affixed along a first side of the display screen;
    a second linear input device affixed along a second side of the display screen;
    a third linear input device affixed along a third side of the display screen;
    a planar input device comprising a touchpad located on the back face of the apparatus; and
    control logic for manipulating content displayed on the display screen responsive to user input via the first, second, third, and planar input devices.
    wherein each of the linear input devices is located on the front face of the apparatus.

13. An apparatus, comprising:
a display screen on a front face of the apparatus;
a first linear input device affixed along a first side of the display screen;
a second linear input device affixed along a second side of the display screen;
a third linear input device affixed along a third side of the display screen;
a planar input device located on the back face of the apparatus;
control logic for manipulating content displayed on the display screen responsive to user input via the first, second, third, and planar input devices; and
a speaker that outputs sound through at least one hole extending through the back face and the planar input device.

14. The apparatus of claim 13, wherein the planar input device comprises a touchpad.

15. An apparatus, comprising:
a display screen on a front face of the apparatus;
a first linear input device affixed along a first side of the display screen;
a second linear input device affixed along a second side of the display screen;
a third linear input device affixed along a third side of the display screen;
a planar input device comprising a touchpad located on the back face of the apparatus; and
control logic for manipulating content displayed on the display screen responsive to user input via the first, second, third, and planar input devices,
wherein the touchpad has at least one hole through which sound from an internal speaker passes, and wherein the touchpad is resistant to sound interference.

16. The apparatus of claim 1, wherein the touchpad is on the back face of the apparatus, substantially opposite from the display screen.

17. The apparatus of claim 15, wherein the planar input device comprises a touchpad.

18. An apparatus, comprising:
a casing;
a speaker housed within the casing;
a touch-sensitive sound interface resistant planar input device covering a first face of the casing, wherein the planar input device comprises at least one hole through which sound emitted from the speaker passes; and
a display screen covering a second face of the casing.

19. The apparatus of claim 18, wherein the touch-sensitive sound resistant planar input device comprises a touchpad, wherein the at least one hole of the touch-sensitive sound-resistant planar input device is larger than a corresponding hole in the casing of the apparatus.

20. The apparatus of claim 18, wherein the touch-sensitive sound resistant planar input device comprises a touchpad, wherein the touch-sensitive sound-resistant planar input device has sufficient rigidity such that the diameter of at least one hole does not change to a degree that distorts sound waves emitted from the speaker.

21. The apparatus of claim 18, wherein the touch-sensitive sound resistant planar input device comprises a touchpad, wherein the touch-sensitive sound-resistant planar input device has sufficient rigidity such that the thickness of the touch-sensitive sound resistant planar input device does not change to a degree that distorts sound waves emitted from the speaker.

22. A computer readable medium storing computer readable instructions for performing a method for selecting items on a display screen, comprising:
detecting movement over a first touch-sensitive input sensor area other than an area through which the display screen is visible, wherein the first touch-sensitive input sensor area is resistant to sound interference, said first touch-sensitive input sensor area comprising a touchpad; and
responsive to detecting movement, moving a display element over corresponding content displayed on the display screen.

23. The computer readable medium of claim 22, wherein the computer readable instructions further comprise
detecting movement over a second touch-sensitive input area other than an area through which the display screen is visible, said second touch-sensitive input area comprising a touchpad; and
responsive to detecting movement, altering a size of an image displayed on the display screen.

24. The computer readable medium of claim 22, wherein the computer readable instructions further comprise
detecting movement over a second touch-sensitive input area other than an area through which the display screen is visible, said second touch-sensitive input area comprising a touchpad; and
responsive to detecting movement, panning the content displayed on the display screen.

25. The computer readable medium of claim 22, further comprising detecting a display screen location identified by the display element.

26. The computer readable medium of claim 25, further comprising receiving input data associated with the corresponding content displayed at the detected display screen location.

27. The computer readable medium of claim 25, further Comprising
highlighting the corresponding content;
detecting second movement over the first touch-sensitive input area; and
responsive to detecting second movement, receiving second input data associated with the corresponding content.

28. The computer readable medium of claim 25, further comprising receiving input data associated with the corresponding content displayed at the detected display screen location.

29. The computer readable medium of claim 22, wherein said first touch-sensitive input sensor area comprises at least one hole through which sound emitted from the speaker passes.

30. A method for selecting items on a display screen, comprising:
detecting movement over a first touch-sensitive input sensor area other than an area through which the display screen is visible, wherein the first touch-sensitive input sensor area is resistant to sound interference, said first touch-sensitive input sensor area comprising a touchpad; and
responsive to detecting movement, moving a display element over corresponding content displayed on the display screen.

31. The method of claim 30, further comprising:
detecting movement over a second touch-sensitive input area other than an area through which the display screen is visible, said second touch-sensitive input area comprising a touchpad; and responsive to detecting movement, panning the content displayed on the display screen.

32. The method of claim 30, further comprising detecting a display screen location identified by the display element.

33. The method of claim 32, further comprising receiving input data associated with the corresponding content displayed at the detected display screen location.

34. The method of claim 32, further comprising:
highlighting the corresponding content;
detecting second movement over the first touch-sensitive input area; and
responsive to detecting second movement, receiving second input data associated with the corresponding content.

35. The method of claim 32, further comprising:
receiving input data associated with the corresponding content displayed at the detected display screen location.

36. The method of claim 30, further comprising:
detecting movement over a second touch-sensitive input area other than an area through which the display screen is visible, said second touch-sensitive input area comprising a touchpad; and
responsive to detecting movement, altering a size of an image displayed on the display screen.

* * * * *